United States Patent [19]

Broeckl et al.

[11] 4,003,645
[45] Jan. 18, 1977

[54] FILM-HANDLING APPARATUS

[75] Inventors: Heinz Broeckl, Gmund; Friedrich Forch, Vienna; Otto Freudenschuss, Vienna; Eduard Keznickl, Vienna; Gottfried Patels, Vienna; Leopold Rollenitz, Totzenbach, all of Austria

[73] Assignees: Karl Vockenhuber; Raimund Hauser, both of Vienna, Austria

[22] Filed: Feb. 11, 1974

[21] Appl. No.: 441,000

Related U.S. Application Data

[62] Division of Ser. No. 189,623, Oct. 15, 1971, Pat. No. 3,806,244.

[30] Foreign Application Priority Data

| Oct. 20, 1970 | Austria | 9455/70 |
| Nov. 5, 1970 | Austria | 9983/70 |
| Nov. 19, 1970 | Austria | 10457/70 |
| Nov. 24, 1970 | Austria | 10601/70 |
| Mar. 4, 1971 | Austria | 1893/71 |
| Apr. 6, 1971 | Austria | 2944/71 |

[52] U.S. Cl. .................................... 352/109
[51] Int. Cl.² .............................. G03B 41/10
[58] Field of Search .......................... 352/109

[56] References Cited

UNITED STATES PATENTS

| 2,843,006 | 7/1958 | Tyler | 352/109 |
| 3,067,284 | 12/1962 | Baldwin | 352/109 X |
| 3,677,626 | 7/1972 | Ferrari | 352/109 |

Primary Examiner—Monroe H. Hayes
Attorney, Agent, or Firm—Ernest G. Montague; Karl F. Ross; Herbert Dubno

[57] ABSTRACT

A film strip is continuously advanced past a film gate of a camera or a projector while light coming from the strip through the film gate is reflected by a pivotable mirror keeping a beam of light trained upon a specific area of the strip, i.e., a frame, during a major part of a recurrent operating cycle. The mirror is reciprocated during each operating cycle under the control of an electrical signal generator synchronized with the strip-feeding mechanism, either directly or through markings (e.g., perforations) on the film strip, and performs a relatively slow forward sweep followed by a relatively fast return sweep, the latter being effected by a pulse of one polarity immediately followed by a pulse of opposite polarity arresting the mirror drive. In one embodiment (FIG. 8), the control circuit for the mirror drive includes a differential amplifier responsive to a balanced pickup of light from a marginal film perforation, serving as a synchronizing mark, by two photocells illuminated by some of the light rays reflected by the mirror, the disappearance of the mark behind the film gate resulting in the generation of the sweep-reversing pulse pair. In another embodiment (FIG. 15), the image of a film perforation traverses a vignetting mask of triangular shape and impinges on a transducer which converts the light rays passed by the mask into a sawtooth voltage for the forward sweep, the attainment of a predetermined voltage threshold triggering the generation of the pulse pair. In a further embodiment (FIG. 20), the forward sweep is stabilized by an error signal fed back to the control circuit from a differential amplifier receiving a reference voltage and the output of a photodiode illuminated by part of the light from a film frame to be projected onto a receiving screen, the photodiode output remaining constant during the forward sweep with synchronous motion. Synchronization may also be carried out (FIG. 16) with the aid of a swingable claw engaging in successive perforations of the advancing film strip.

5 Claims, 20 Drawing Figures

FILM-HANDLING APPARATUS

The present application is a divisional application of our co-pending patent application Ser. No. 189,623, filed Oct. 15, 1971, now U.S. Pat. No. 3,806,244.

BACKGROUND OF THE INVENTION

This invention relates to strip-handling apparatus, such as a cine camera or projector, utilizing a strip such as a film which is moved continuously through a gate. More particularly, the invention is concerned with details of an optical system having a deflector which is driven to compensate for the motion of the strip with respect to the system when the apparatus is in use. The deflector with which the invention is concerned performs an oscillatory motion having a forward sweep motion during which it is synchronized with the strip movement through the gate, and a return or fly-back motion when the deflector is returned relatively rapidly to an initial position in order to commence the next forward sweep.

Although the aspects of the invention mentioned below are primarily concerned with the photographic field, they may equally well find application in other fields, for example in the fields of systems or computers.

SUMMARY OF THE INVENTION

An apparatus according to our invention, designed to handle an elongate recording strip for optical information (hereinafter simply referred to as a film), comprises feed means for continuously advancing the film past the information-transfer point, specifically a film gate, where light rays incident upon the film from a suitable source are formed by optical means into a beam generally perpendicular to the film. A swingable mirror in the path of the beam, pivotable about an axis transverse to the direction of film motion with the aid of reciprocating drive means, acts as a light-deflecting means keeping the beam trained upon a specific area of the advancing film in a relatively slow forward sweep during a major portion of a recurrent operating cycle and restoring the beam to an initial position in a relatively fast return sweep during a terminal phase of the cycle. For this purpose, the reciprocating mirror drive is provided with a control circuit responsive to electrical signals, the signal-generating means producing a pair of consecutive pulses of opposite polarities in the terminal cycle phase for effecting the return sweep and arresting the mirror in its initial position, respectively. The signal-generating means is triggered, and the forward sweep of the mirror oscillation is matched to the advance of the film, by synchronizing means controlled by the film-feeding mechanism, advantageously through the intermediary of the film itself. Thus, the film may be provided with optically detectable marks picked up by a photoelectric device in the synchronizing circuit, these marks being for example the usual perforations engaged by a feed sprocket. Alternatively, the synchronizing means may comprise a guide structure for leading part of the perforated film along an arc of a circle, in combination with a claw mounted for oscillation about the center of that circle along the arc, this claw being biased into engagement with an aligned film perforation and being operatively coupled with the mirror for matching the pivotal motion of the latter to the advance of the film during the forward sweep.

BRIEF DESCRIPTION OF THE DRAWING

The invention will now be described in more detail by way of example, with reference to the accompanying drawing, in which.

SPECIFIC DESCRIPTION

In a motion-picture projector or camera according to our invention, the individual film frames are projected by means of a swivel-mounted tilting mirror and a projection objective. The mirror is so moved that motion of the film is compensated and a stationary picture is formed on the projector screen or framed in the camera window. A train of electrical pulses are derived from optical markings on the film, for example from the perforations thereof, and these pulses control movements of the mirror in synchronism with the film. The electrical position control establishes extremely short fly-back times for the mirror without interposition of other moving parts in the optical path,.

Figure 1:
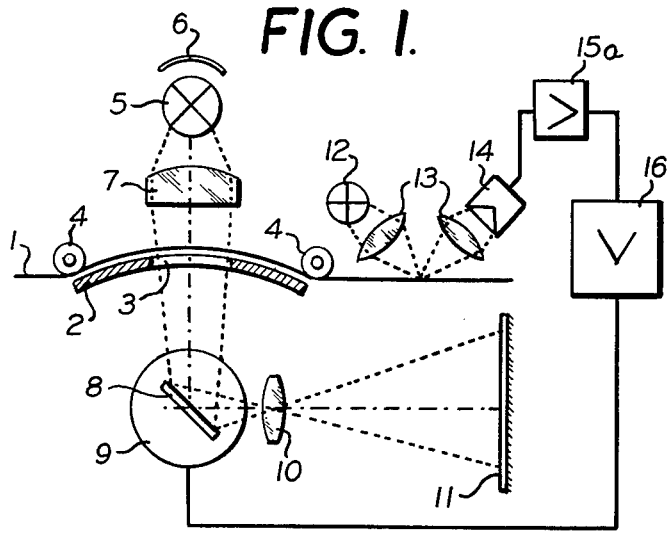
FIG. 1 illustrates in schematic form one possible arrangement of a tilt-mirror deflector in a projector embodying our invention.

FIG. 1 shows a film strip 1 which is continuously moved by known means across a film gate 2 having a window 3 and associated with two rolls or guide pins 4 provided for properly positioning the film on the film gate. A light source, comprising a lamp 5, a mirror 6 and condensing a lens 7, illuminates as evenly as possible the window 3 which is filled by two image frames of the film strip. The light beam arriving from the film 1 and window 2 encounters a tilting mirror 8, connected with the shaft of a tilt motor 9, and is transmitted through a lens assembly 10 to a projector screen or similar receiving surface. The synchronization of the film movement with the mirror movement, necessary for faultless presentation of the film, is achieved with a position-sensing arrangement consisting of a lamp 12, an optical system 13 and a light receiver 14. The light from the lamp 12 reflected from the film is transmitted through the optical system 13 to the receiver 14 which converts the light into electrical current. The arrival of a perforation or a non-reflecting zone of the film margin in the optical path, produces an electrical pulse in the receiver output, which is amplified by amplifiers 15 and 16 and used to control the positioning of the tilt-mirror 8. In order to make adjustment of the image-frame line possible, the entire assembly comprising the parts 12, 13 and 4 is displaceable longitudinally of the film.

Figure 2:
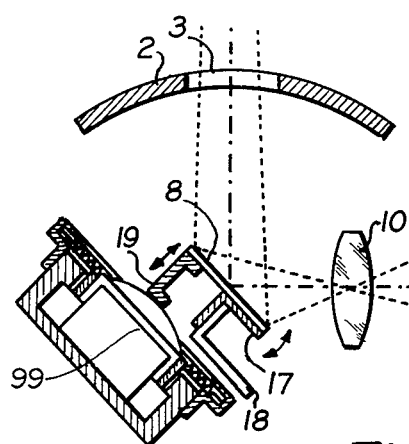
FIG. 2 shows schematiccaly in section a drive for tilting the mirror.

In FIG. 2 we have shown another driving system for a tilting mirror. The light from a projector lamp (not shown) is transmitted as before through the window 3 of a film gate 2 onto a movably mounted tiltable mirror 8 which reflects the light through the lens assembly 10 onto a screen 11. The mirror is movable with the help of a woven or plastic strip 17 and is tiltable against an angle stop 18. a reciprocating pulsed system 99, similar to a dynamic loudspeaker, drives the free end of the mirror with the help of a lacquer stiffened woven or plastic strip 19. In this way linear motion is converted into a tilting motion of the mirror. The diaphragm arrangement necessary for centering the magnetic coil does, however, establish a dynamic coupling with the surrounding air so that an oscillatory drive of this design for the mirror develops more noise than a motor constructed on the principle of a galvanometer.

Figure 3:
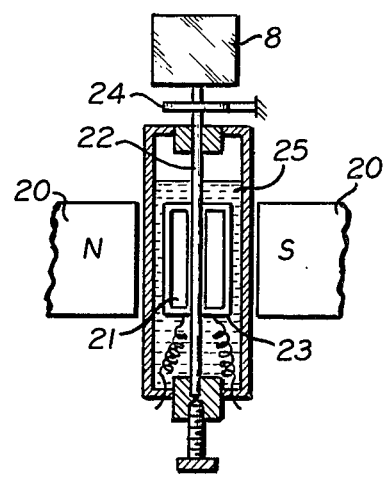
FIGS. 3 and 4 show two different drives for tilting the mirror.

FIg. 3 shows one possible construction of such a galvanometer-type motor. Located between poles of a magnet 20 are a static iron core 21 and a spindle 22 on which a coil 23 is rotatably mounted, the spindle being held in its initial position by a spring 24. A liquid 25 provides damping. It is also possible to utilize copper or aluminum frames to produce damping by eddy-current effect. Liquid damping has, however, the advantage that the liquid enables lower natural resonance frequencies of the oscillatory system to be damped so that a more sensitive motor can be used.

Figure 4:
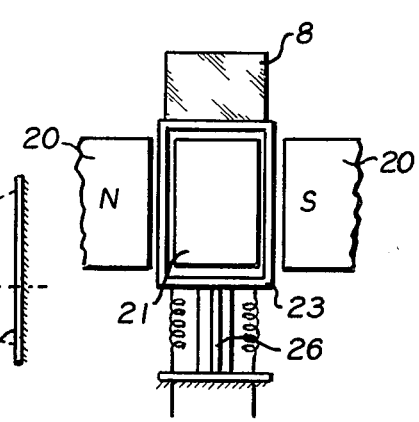

In FIG. 4 there is shown a motor which is provided with conventional deflecting means. The coil 23 is mounted on a torsion strip 26, whose cross-section is so chosen that it readily permits torsional oscillations while preventing oscillations normal to the torsional axis. A suitable profile for the torsion spring is one of generally cruciform cross-section.

Figure 5:
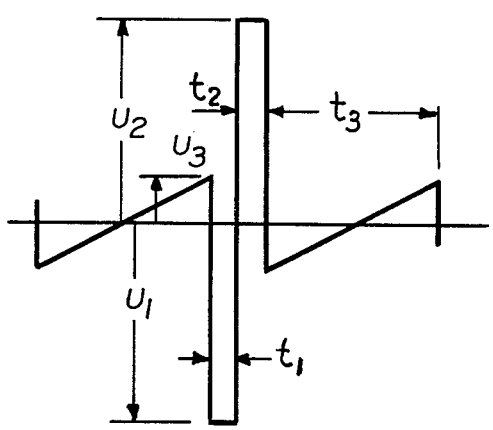
FIG. 5 shows an electrical waveform resulting in an extremely quick return or fly-back motion of the deflecting mirror.

FIG. 5 shows a possible current waveform through the oscillatory coil of the motor enabling on extremely short fly-back time to be achieved. During the time T1, a reverse current pulse of magnitude $U_1$ is generated, the pulse being triggered from the synchronizing signal of the film and accelerating the oscillatory coil and thus the mirror very rapidly to their initial position. Were only this reverse pulse to be impressed on the oscillatory system, the oscillatory coil after its termination would move beyond the initial position and begin to execute a damped oscillation that would be useless for the intended operation. Therefore a braking pulse is applied for a suitable time T2 to the oscillatory system as a continuation of the reverse pulse and has a magnitude $U_2$, the braking pulse halting the oscillatory coil at the end of the time T2. The oscillatory coil stands still when a further cycle of sawtooth current begins the deflection of the mirror over a period T3. As the current at the beginning of the sawtooth cycle is identical with the current at the end of the braking pulse, a current build-up process is accordingly avoided and the mirror executes an exact tilting motion. With such an arrangement fly-back times in the region of half a millisecond are obtainable.

Figure 6:
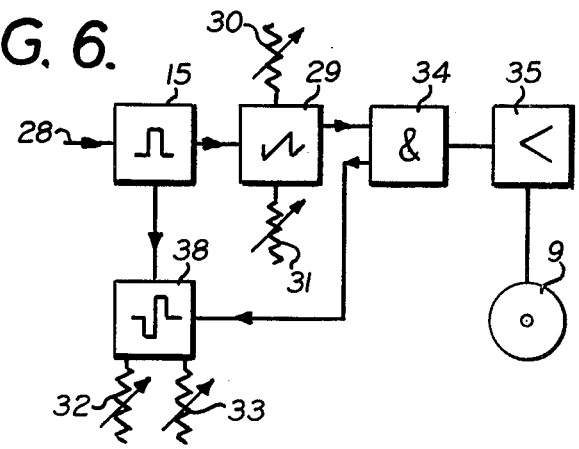
FIG. 6 is an electrical block diagram showing control circuitry for a tilt-mirror drive motor.

FIG. 6 is a block diagram of the electrical circuit of the motor. The synchronizing pulse from the film perforation enters the amplifier 15 at 28. The amplifier 15 drives a sawtooth generator 29 which has amplitude and linearity regulators 30 and 31, respectively, and also a double pulse generator 38 having controls 32 and 33 for adjusting the times $T^1$ and $T^2$. The sawtooth of waveform and the double pulse are combined in a mixing circuit 34 to obtain the waveform of the shape shown in FIG. 5, which controls by way of an output stage 35 the motor 9. The frequency of the sawtooth generator 29 can be matched to different film velocities.

Figure 7:
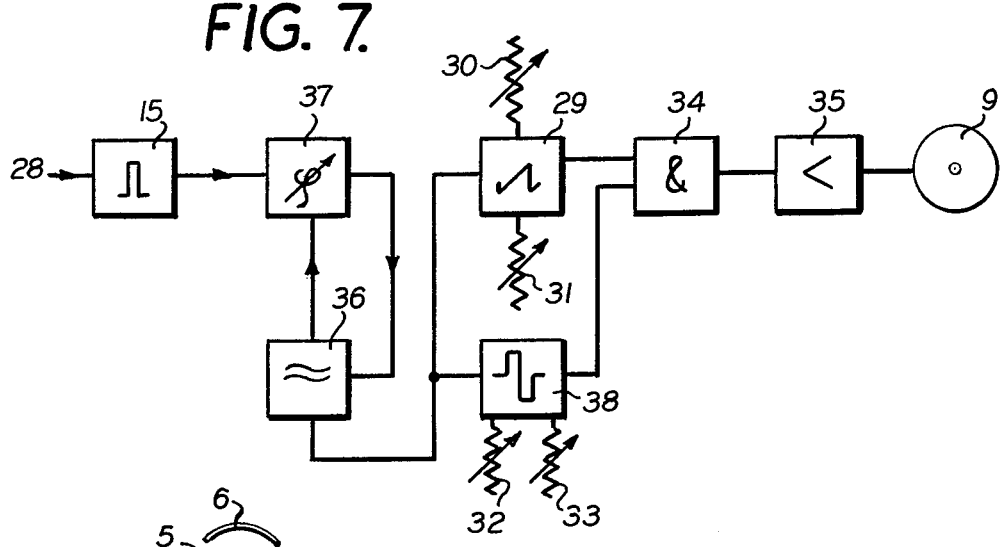
FIG. 7 is a block diagram showing another way of synchronizing electrically the control of the tilt-mirror drive with the advance of a film strip.

FIG. 7, like FIG. 6, shows in block-diagram form, a motor-control circuit but with indirect synchronization. The frequency of an oscillator 36 is compared in a phase comparator 37 with a synchronizing pulse from input amplifier 15. The output voltage produced by the comparator so controls the oscillator 36 that the frequency and phase of the oscillator output and the synchronizing pulses coincide.

Figure 8:
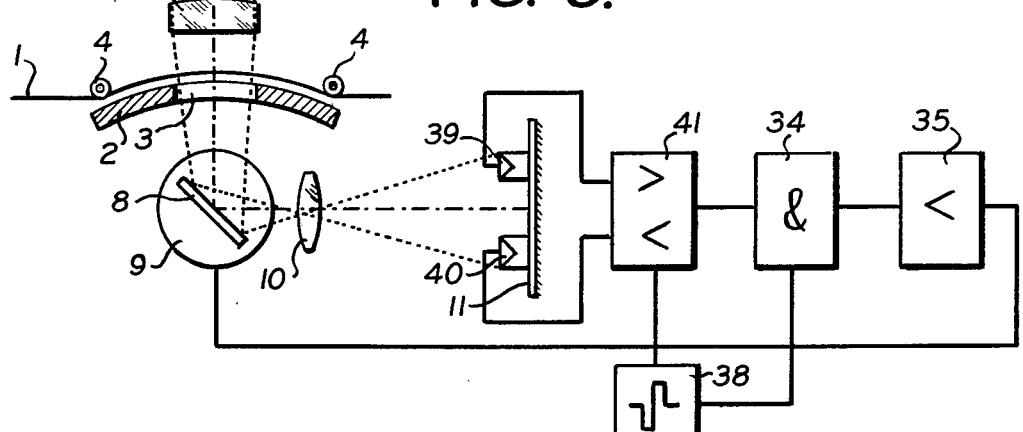
FIG. 8 shows diagrammatically a further way of electrically controlling the tilt-mirror drive.

FIG. 8 shows another possible arrangement for the mirror-tilting mechanism. The synchronizing marks on the film border are imaged by means of an optical system consisting of illuminating components 5 to 7, the tilt-mirror 8 and the objective 10 on two light detectors such as photocells 39 and 40. With the assistance of a differential amplifier 41, the motor 9 is now so controlled by a corrective signal from that amplifier that the image of the synchronizing mark always falls evenly on both photocells during the forward sweep of mirror 8. Departure of the synchronizing mark from the window 3, produces in the amplifier 41 a trigger pulse for generator 38 which controls the rapid return motion of the mirror to its starting position thus, amplifier 41 responds to a low value of the output voltage of photoelectric means 39, 40. In the case of an unbiased mirror-tilting motor 9, the rectangular double pulse from the generator 38, obtained as before, is fed to the mixer 34 which also receives the correction signal from amplifier 41 and supplies the output stage 35 controlling the motor 9.

Figure 9:
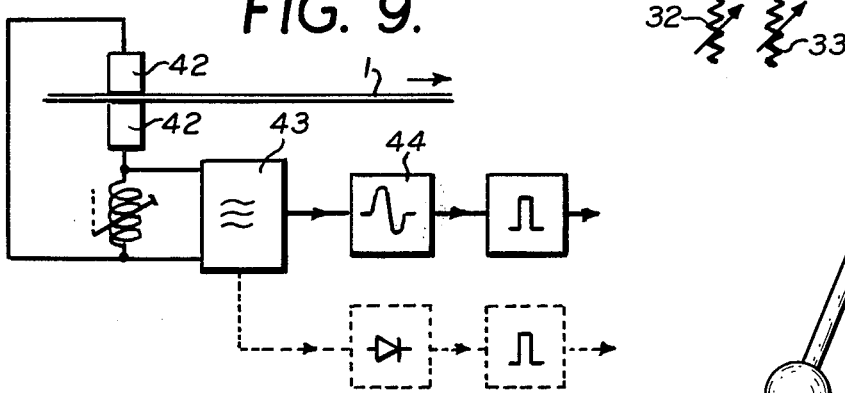
FIG. 9 shows a way of deriving a synchronizing pulse from a film perforation.

FIG. 9 shows a possible arrangement for deriving synchronizing pulses from the perforations, this system being usable with a blank film.

The film 1 travels between two electrodes 42 constituting a condenser.

As a result of the change in dielectric strength in the presence of a perforation, the capacitance of the condenser changes. As this condenser forms part of a resonant circuit of an oscillator 43, a pulse for controlling the motor 9 can be generated by a frequency discriminator 44, connected to the oscillator 43, each time the oscillator frequency assumes a value characteristic of the presence of a perforation between the condenser electrodes. The oscillator 43 could also be so designed as to generate a control pulse for the motor 9 when a perforation lies between the electrodes of the condenser 42.

Figure 10:
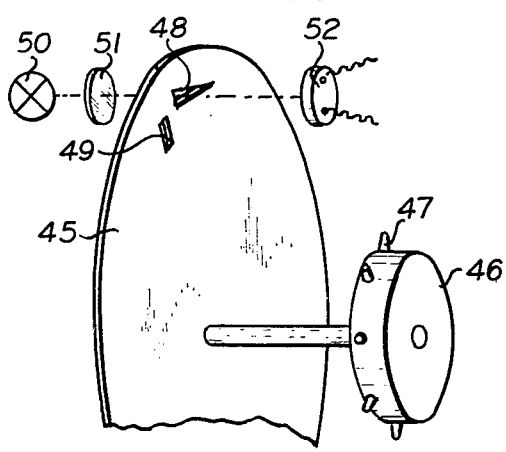
FIG. 10 represents a preferred pulse generator employing an information carrier.

According to FIG. 10 there is provided an information carrier, constructed as a disc 45, for a synchronous production of the desired pulses. The disc is driven by a sprocket wheel 46 whose teeth 47 engage in the film perforations.

The pulses are represented on the disc 45 as cutouts 48, 49 provided in a control track on the margin of the disc. These cutouts are illuminated by a schematically depicted projection system including a small lamp 50 and a lens 51, in such a way that light from the projection system falls on a photo-electric transducer 52. The transducer delivers a stronger or weaker output signal which varies continuously with the intensity of the light allowed through the cutouts 48, 49. In the case of the sawtooth-signal-forming cutouts 48, the output signal of the transducer 52 will also have a sawtooth shape and, after the attainment of a certain level, will fall suddenly again to zero so that a galvanometer constructed as in FIG. 3, for example, is returned to an initial position under the action of a restoring spring 24. In order to prevent a swing of the galvanometer coil frame 23 in this case, a braking pulse is supplied subsequently to the frame by means of the cutouts 49. The described arrangement offers the advantage that the control track formed by the cutouts 48, 49 is not subjected to wear. In the case of a magnetic-recording control track or the employment of a sound groove, it is preferable if several identical information tracks be provided whereby the appropriate track-reading device can be switched from one track to the next, should track wear make it necessary.

Figure 11:
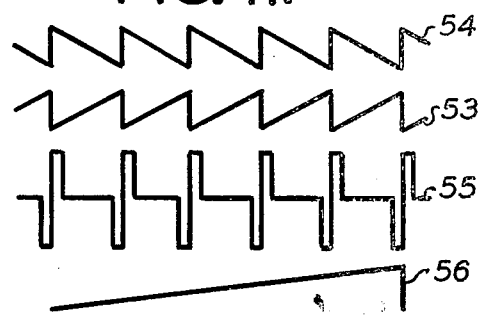
FIG. 11 shows diagrammatically respective signals obtained from four recording tracks on an information carrier.

FIG. 11 illustrates another arrangement in which four different control tracks 53–56 are provided on an information carrier not shown in detail. Sawtooth waves are recorded on the track 53 to serve as the tilt control for the mirror 8 on forward movement of the strip, whereas the track 54 contains oppositely directed sawteeth for enabling projection to occur during reverse running of the film. The double impulses which are provided on the track 55 are supplied to the electric-motor oscillatory system either directly, for example by means of a second galvanometer-coil winding, or indirectly, by way of a mixing stage. The sawtooth signal on track 56, finally serves for synchronization of a sound recording and extends preferably over more than the illustrated pulses on the other tracks, for example over a span of 16 such pulses.

Figure 12:
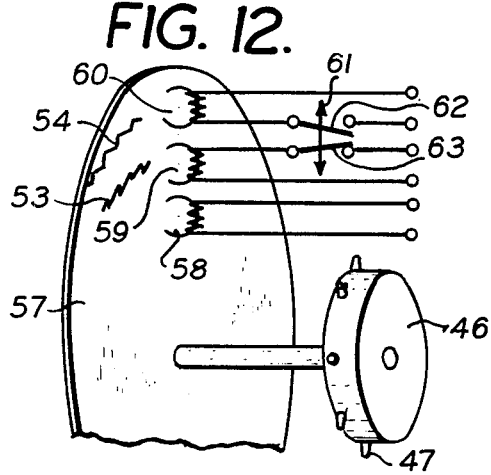
FIG. 12 shows a modification of the information carrier shown in FIG. 10.

In FIG. 12 a disc 57, arranged in much the same way as the disc 45, is formed with recorded tracks 53–55 of FIG. 11 (only the first two being shown in FIG. 12) which in the illustrated embodiment are read by means of magnetic pick-up heads 58–60. This arrangement enables simple switching from the track 53 to the track 54 by reason of the fact that a control switch 61 has two contacts 62, 63 respectively inserted in circuit with the magnetic heads 59, 60 and linked for alternate operation so that when one is open the other is closed. In this way the need for mechanical displacement of the readout means from one track to another is avoided.

Figure 13:
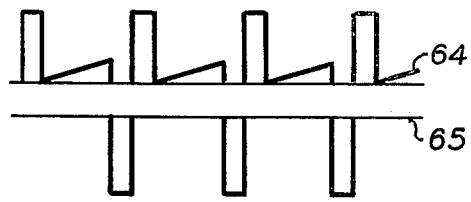
FIG. 13 shows how a pulse may be divided between two different recording tracks.

It is advantageous from a practical viewpoint, especially with optical scanning of a record formed on a data carrier, if a track 64 (see FIG. 13) carries one of the two rectangular pulses of opposite polarities, specifically the braking pulse immediately preceeding, whereas the fly-back pulse is on the track 65 and here the combined signals supplied by the track 64 are positive whereas the track 65 supplies a negative pulse.

Figure 14:
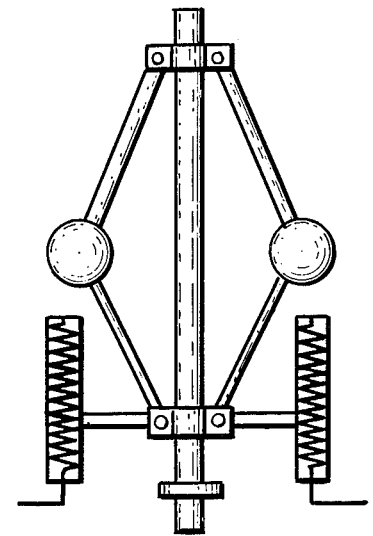
FIG. 14 shows diagrammatically a centrifugal governor for controlling variable electrical resistances employed in the arrangements shown in FIGS. 9 to 11.

In addition to the employment of frequency-modulated recordings on a carrier, the system, illustrated in FIGS. 6–8, include means for controlling the amplitude of the double-pulse generator in accordance with the film velocity and also, if desired the amplitude of the sawtooth generator 29 by adjustment of the control resistances 32, 33 and 30, 31, respectively. These resistances can be constructed as centrifugally controlled resistors as schematically shown in FIG. 14 where a centrifugal governor 100 controls the tapping points of two resistors 101, 102 disposed on diametrically opposite sides beneath the governor.

Figure 15:
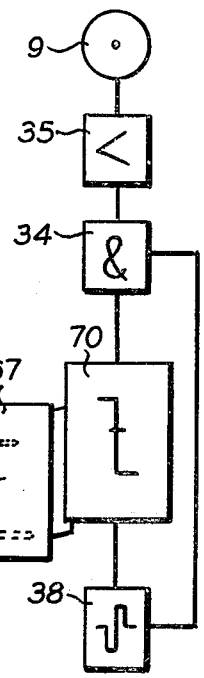
FIG. 15 shows diagrammatically a further way of producing electrical pulses for controlling the movement of a tilt-mirror, or other form of optical deflector in synchronism with the movement of a film strip.

A further form of control means for use in a system embodying our invention is illustrated in FIG. 15. In this case a lamp 5 is again provided for illuminating the perforations of a film strip 1, the image of any perforation being projected onto a generally rectangular photo-electric transducer 67 by means of a schematically indicated objective 10' and a screen 66 formed with a slit. A vignetting mask 68 is disposed between the screen 66 and the transducer 67 and is formed with a triangular slot 69 which limits the length of the slit image projected onto the transducer 67, in accordance with the position in which the image appears. During the movement of the film 1 over a film gate (not shown), the projected images of the slit in the screen 66 travel in a corresponding manner across the vignetting mask 68, the transmitted slit images maintaining lengths corresponding to the breadths of the triangular slot 69 and producing from the transducer 67 a progressively changing output signal, corresponding to the rising flank of a sawtooth wave, as a consequence of the triangular slot 69. The sawtooth pulse so formed is led through a threshold-responsive switching circuit 70, for example a Schmitt trigger, which triggers operation of a double-pulse generator 38 on the one hand and extends on the other hand to a mixing stage 34 in which the sawtooth waveform and the double pulse are mixed. The outgoing signal controls, again by way of an amplifier 35, a mirror-tilting electric motor 9.

Figure 16:
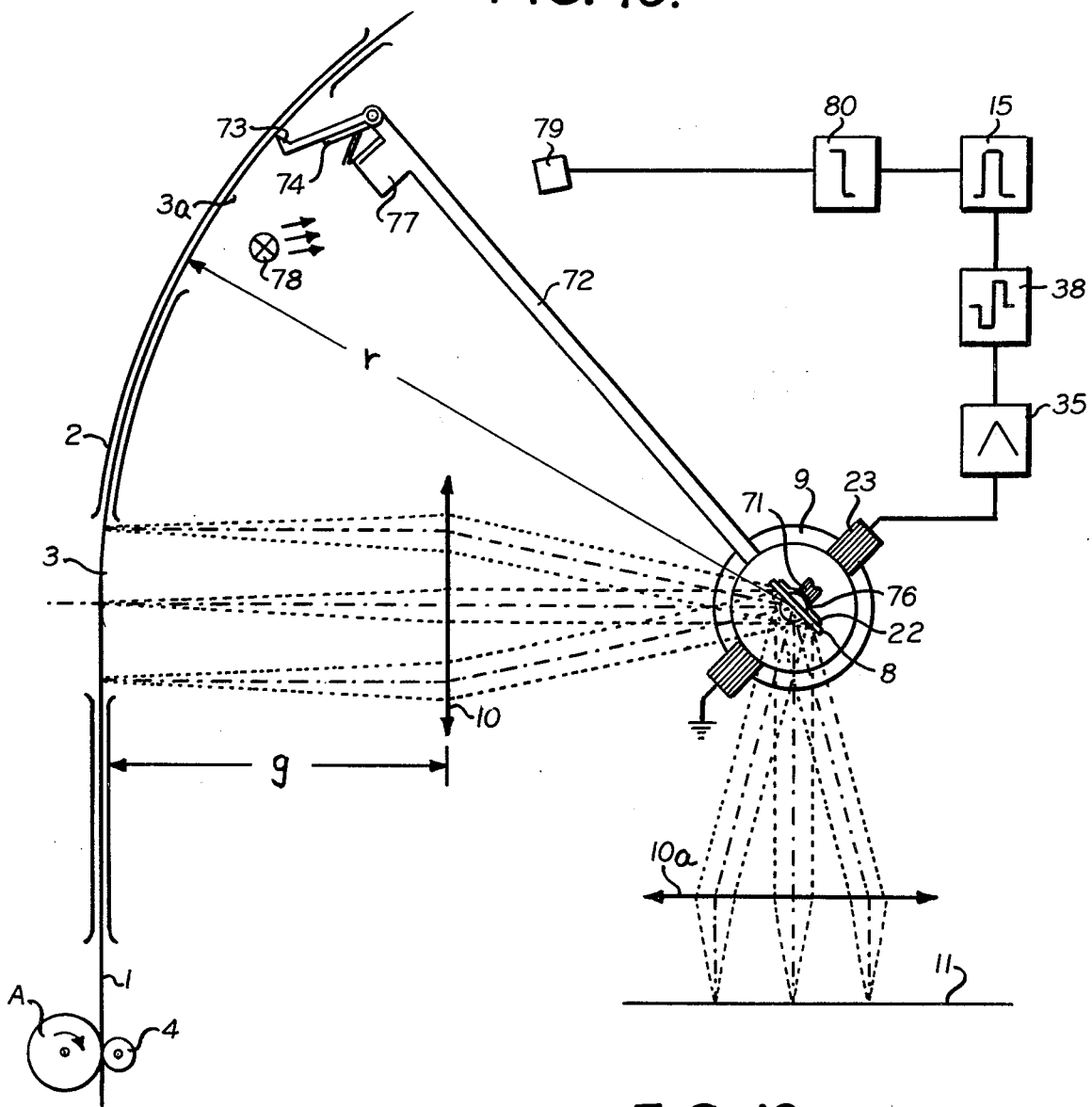
FIG. 16 shows schematically a further arrangement using a telecentering device and a claw arm for maintaining synchronous movement between a film strip and a tilt-mirror.

Within the scope of the invention many different constructions are imaginable. For example it is possible to record a pulse, shaped as shown in FIG. 5, from the outset directly onto a pilot track on the film. In a system not requiring a fly-back force, the rising flank of a sawtooth can be replaced by a current of constant magnitude. Such a system is illustrated in FIG. 16 where parts having the same function as those of preceding FIGS., bear the same reference numerals. The film 1 is pulled across the film gate 2, containing the window 3, at a uniform speed. The drive is obtained from a drive roll A which co-operates with a roller 4. At a location remote from the window 3, the film gate is additionally formed with another opening or slit 3a in which the toe of a film-feed claw 73 can engage. The film-feed claw 73 is supported on a claw arm 72 and is pressed by an angle spring 74 towards the film 1 and its perforations. The claw arm 72 is attached to the coil 23 of the galvanometer 9 on the shaft 22 of which the mirror 8 is fastened by means of a holder 76 and a clamping screw 71.

The galvanometer is suitably constructed without a restoring bias and its film-following motion is controlled by the claw 73. To this end it continuously receives from the double-pulse generator a voltage $U_3$, see FIG. 17 (Periods $t_1$, $t_2$, and $t_3$ indicated in FIG. 17 respectively correspond to times -3, -1 and -2 of FIG. 5.). The voltage $U_3$ ensures that the claw 73 is not withdrawn from the perforation of the film momentarily engaged, as is normally the case. On the contrary, the leading end of the claw 73 lies against the leading edge of the momentarily engaged perforation, looking in the direction of movement of the film, instead of being pulled back. The thrust of the claw 73 is naturally very small and is in fact just sufficient to hold the leading end of the claw 73 in position at the forward end of the engaged perforation. It is thus assured that the claw-contacting side of the momentarily engaged perforation in the projector is the same as that contacted by the film-drive claw in the camera. In this way tolerances in the spacing of the perforations do not affect the positioning of the mirror.

At the end of the movement of the claw 73 and claw arm 72 synchronized with the film speed, a lug 77 formed on the arm 72, intersects a light path extending across the direction of movement of the lug 77. In FIG. 16 the light path extends between a lamp 78 and a photosensitive device 79 on opposite sides of the arm 72 these parts bracketing the path of the lug 77.

The lamp 78 and the light detector 79 could also lie on the same side of the lug 77, if the device 79 is illuminated by way of a mirror formed, for example, by a reflecting surface on the lug 77. In either case a change in the output of the device 79 is produced by the lug 77 in the beam-interception position, whereupon a flyback pulse of voltage $U_1$ and a braking pulse of voltage $U_2$ are emitted by a switching stage 80. As is obvious, when the claw 73 is constructed as a pawl with a slanting trailing surface, no additional means are required to reposition the galvanometer coil 23 and the claw arm 72 and to extract the claw 73 from the perforation. It is clear that the moment of the claw arm 72 on the coil shaft 22 should be compensated. Also the galvanometer 9 is correspondingly damped, for example by utilizing a short-circuited coil and/or by designing the amplifier 35 with a very small output impedance. To attain an effective electrical damping a sufficiently strong magnetic excitation of the galvanometer is necessary. For example, the field strengths in question should approach around 5000 gauss.

A further problem with utilizing a claw lies in the fact that, with its angular movement, for example corresponding to one frame on the film 1, the mirror 8, although mounted on the same axis, is required to move through only half the angle of the claw arm 72 as the angle between the incident and the reflected beam on the mirror is doubled. This problem may be solved in different ways.

In the example illustrated schematically in FIG. 16, the mirror 8 is part of an optical system having a forward lens group 10 and a rear lens group 10a. This optical system produces a telecentering effect on the light path, i.e., a field of parallel rays between the two lens groups, the mirror 8 being arranged approximately in the zone of highest concentration of the light rays from the lens 10 so that it can be made very small.

The object distance g between the forward lens group 10 and the gate window 3 corresponds in the illustrated example to the focal length of the lens group 10, so that a beam of parallel light rays is produced behind the lens group 10. An exceptional freedom from distortion is achieved by the utilization of such an optical system, enabling to dimensions of mirror 8 to be greatly reduced. The radius r of the claw arm 72 with the claw 73 is now dimensioned, according to a feature of the invention, to be twice as large as the focal length of the lens group 10. In this way not only is the solution to the above-mentioned problem found, namely the maintenance without mechanical means of a suitable ratio between the movement of the claw with the radius r and the movement of a film frame with the effective optical radius corresponding to the focal length g, but besides one also has a greater freedom regarding the disposition of the slit 3a in the film gate. The choice of the radius r as equal to twice the focal length g is subject to tolerances of ±10%. With the use of a telecentered beam path in the illustrated manner, there is achieved in addition to negligible aberration a reduction in the importance of the tolerances to an insignificant level.

As is known, certain standards govern the spacing between the claw-operating slit and the film gate of a camera. For example, in accordance with one of these standards the claw slit should lie between two and three perforations ahead of the gate window. These regulations can be applied in corresponding manner to the apparatus of the invention by designing the length of the claw arm 72 in the described way. We thus realize a projector having the advantage that the claw 73 actually occupies the same position which the claw in the camera occupied. Also, by this means, a greater precision in the guiding movement of the mirror is achieved.

As mentioned, the galvanometer is advantageously constructed without a restoring bias. It is clear from the above description that the claw arm 72 is not required to apply any mechanical force. For this reason the claw arm 72 may be formed as a slender needle. Its mass is therefore extremely small. If desired, it is also readily possible to apply a biasing force in one or other direction. If such a biasing force acts on the galvanometer of FIG. 16 in the clockwise sense, it is necessary to apply to the galvanometer a sawtooth voltage in place of the constant voltage $U_3$. On the other hand, if the biasing force is effective in the counterclockwise direction, the voltage applied in the time $t_1$ (FIG. 17) can be reduced. In circumstances when the mechanical biasing force is constant over the entire angular range of movement of the claw it is possible to reduce the applied voltage in the time interval $t_1$ to zero, but if the mechanical restoring bias has a varying magnitude, the voltage in that time interval can be correspondingly shaped, e.g. as an inverted sawtooth with reference to the sawtooth illustrated in FIG. 5.

Figure 18:
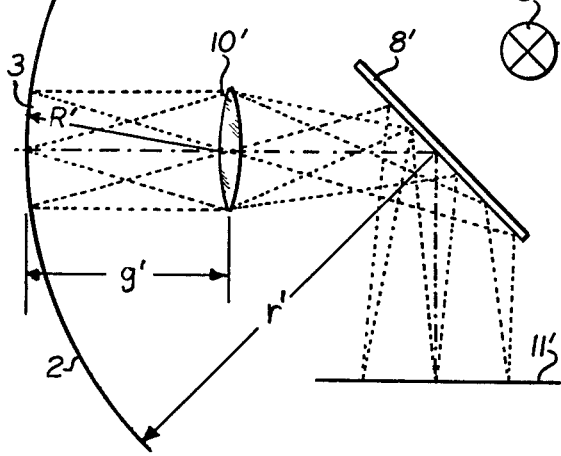
FIG. 18 shows an arrangement for scanning a film strip with replacement of the telecentering device of FIG. 16 by a film gate having a zone of increased curvature.

The above-described dimensioning of the length of the claw arm 72 may be also applied to an optical system which does not employ telecentered optical paths, as is shown in FIG. 18. To avoid greater distortion, it is advisable to give the film gate 2 a dual curvature, namely in the region of the window 3 a curvature with the optical radius R', whereas in the regions adjacent to the window 3 and/or in the region of the slit for the claw insertion (3a in FIG. 16), a curvature approximating the radius t' of the claw arm 72 should be used. It is also evident from FIG. 18 that the mirror 8' must be made substantially larger when employing an optical system without telecentered optical paths.

Figure 17:
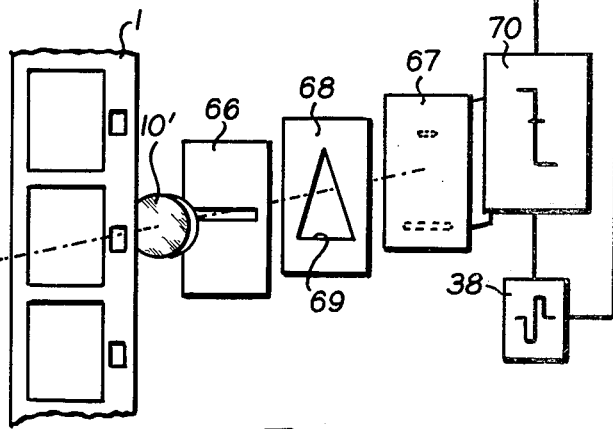
FIG. 17 shows diagrammatically an electrical waveform supplied to a ballistic galvanometer drive for a tilt-mirror.
Figure 17:
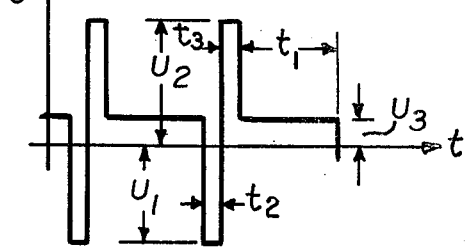
Figure 19:
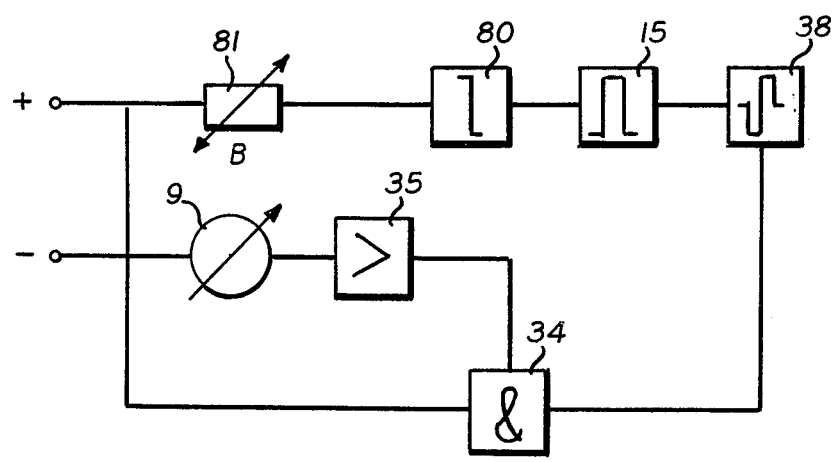
FIG. 19 shows in block-diagram form a circuit for triggering the emission of a double pulse from a magnetic-field-dependent resistor.

It is not necessary to use the photoelectric assembly shown in FIG. 16 in order to trigger the emission of the double pulse when the claw 75 reaches its terminal position. This can also be achieved by means of contacts. A magnetic, field, dependent resistor 81 (FIG. 19) can be provided on the movable part of the galvanometer 9 inside the magnetic field, the resistor triggering the emission of the double pulses by way of a switching stage. With the circuitry shown in FIG. 19 a steady voltage corresponding to the voltage $U_3$ of FIG. 17 is supplied to a mixing stage 34 together with, the double pulse from the generator 38.

Although we prefer to use a claw for synchronizing the movement of the mirror with the movement of the film, other arrangements are also conceivable. It is, for example, possible also to scan the film perforations with an optical light beam. Such scanning is suitable for copies in which, as is generally the case, the film is transparent in the region of the perforations as even a transparent film will absorb a portion of the light passing through it. Furthermore a portion of the light beam incident on the film is reflected back. By means of both of these effects, namely absorption and reflection, detection of the perforations is possible.

Figure 20:
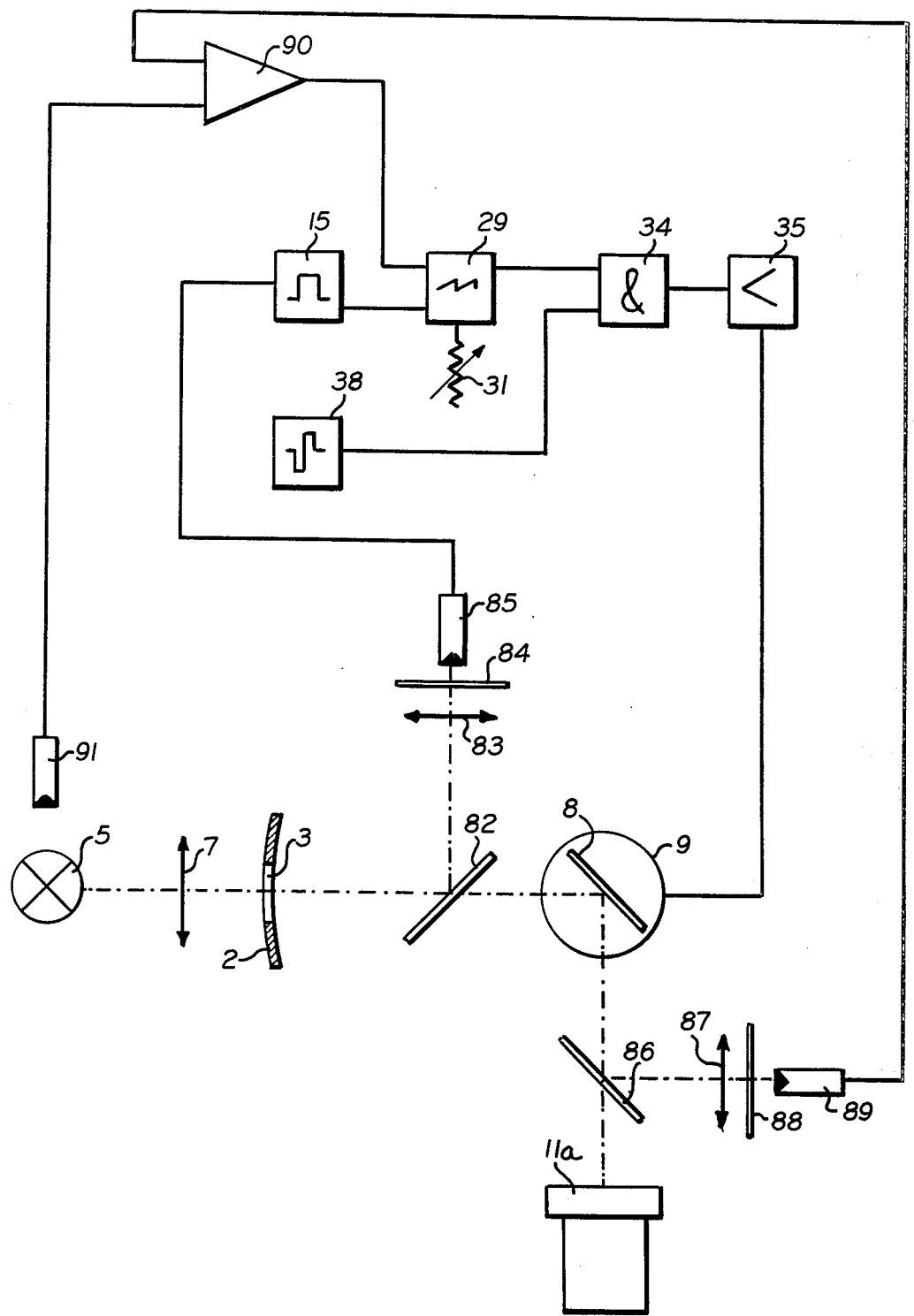
FIG. 20 shows diagrammatically, and with the help of a block circuit diagram, a modified arrangement for synchronizing the motion of a tilt-mirror deflector with the movement of a film through a film gate.

A further possibility is illustrated in FIG. 20. The arrangement shown is in this case similar to that of FIGS. 1 and 6. Here, also, light from a lamp 5 is projected by way of a condenser lens 7, a window 3 and a tilt-mirror 8 onto a screen 11a of, for example, a television tube. In conformity with the block diagram of FIG. 6 there is further provided an amplifier 15, a sawtooth generator 29 with resistor 31 for amplitude adjustment, a mixing stage 34, an output amplifier 35 and a double-pulse generator 38. In the illustrated example of FIG. 20, however, the synchronizing control is modified as a semi-reflecting sheet 82 is additionally provided in front of the tilt-mirror 8, the reflected beam from the sheet 82 being directed through an objective 83 and a screen 84 to a photodiode 85. In this manner the photodiode 85 receives light transmitted through the perforated margin of the film and so scans the perforations of the film in order to control the previously described circuitry. A further semi-reflecting sheet 86 is provided between the tilt-mirror 8 and the screen 11a, to direct light through an objective 87 and a screen 88 with a diaphram opening onto a flat sensitive surface of a photodiode 89. The screen 88 has its opening so constructed that, during projection, the picture of any perforation falls partially on the screen 88 and partially through its opening onto the photodiode 89. When the motion of the picture past the tilt-mirror 8 is correctly compensated, a constant voltage appears at the output of photodiode 89. Any error in optical compensation is detected by a decrease or increase, respectively, in the output voltage of the photodiode with reference to the normal voltage level. The output signal from the photodiode 89 is then processed in a differential amplifier 90 which receives a reference voltage from a further photoelectric transducer 91 illuminated directly by the lamp 5. If the scanning of the picture is error-free, the differential amplifier 90 delivers a standard voltage of value 0. If, however, the output of the amplifier 90 becomes greater or smaller, a positive or negative control voltage is made available which is supplied to the sawtooth generator 29 and used to control the steepness of the sawtooth. Should, therefore, the slope of the sawtooth generator not precisely agree with the film speed, such agreement is restored by means of the illustrated control circuit. Moreover, synchronous oscillations of the film can also be compensated by this control circuit.

While we have disclosed several embodiments of the present invention, it is to be understood that these embodiments are given by way of example only and not in a limiting sense.

We claim:

1. An apparatus for handling an elongate recording strip for optical information, said strip being provided with optically detectable marks, comprising:

feed means for continuously advancing said strip past an information-transfer point;

a source of light rays incident upon said strip at said transfer point;

optical means forming said light rays into a beam generally perpendicular to said strip at said transfer point;

light-deflecting means in the path of said beam pivotable about an axis transverse to the direction of advance of said strip;

reciprocating drive means for said light-deflecting means provided with a control circuit responsive to electrical signals for keeping said beam trained upon a specific area of the advancing strip in a relatively slow forward sweep during a major portion of a recurrent operating cycle and for restoring said beam to an initial position in a relatively fast return sweep during a terminal phase of said cycle;

signal-generating means for said control circuit producing a pair of consecutive pulses of opposite polarities in said terminal phase for effecting said return sweep and arresting said light-deflecting means in said initial position, respectively; and synchronizing means controlled by said feed means for triggering said signal-generating means and matching said forward sweep to the advance of said strip, said synchronizing means including a detecting circuit provided with photoelectric means positioned to receive light from said marks, electronic switching means connected to said photoelectric means for energization thereby, said switching means having an output connected to said signal-generating means for triggering same into emission of said pair of pulses in response to a predetermined output voltage from said photoelectric means, focusing means in said detecting circuit, and masking means for partly obstructing the transmission of light from said marks through said focusing means to said photoelectric means, said masking means having an aperture of nonuniform width for causing generation of said predetermined output voltage from said photoelectric means in a limiting position of a mark.

2. An apparatus as defined in claim 1 wherein the width of said aperture progressively increases along a line of displacement of a light beam trained by said focusing means upon said photoelectric means during a forward sweep, said switching means being responsive to a predetermined maximum output voltage from said photoelectric means.

3. An apparatus as defined in claim 2 wherein said switching means has a first output delivering to said control circuit a rising voltage during said forward sweep and a second output feeding a trigger pulse to said signal-generating means upon attainment of said maximum output voltage.

4. An apparatus for handling an elongate recording strip for optical information, said strip being provided with a series of perforations, comprising:
   feed means for continuously advancing said strip past an information-transfer point;
   a source of light rays incident upon said strip at said transfer point;
   optical means forming said light rays into a beam generally perpendicular to said strip at said transfer point;
   light-deflecting means in the path of said beam pivotable about an axis transverse to the direction of advance of said strip;
   reciprocating drive means for said light-deflecting means provided with a control circuit responsive to electrical signals for keeping said beam trained upon a specific area of the advancing strip in a relatively slow forward sweep during a major portion of a recurrent operating cycle and for restoring said beam to an initial position in a relatively fast return sweep during a terminal phase of said cycle;
   signal-generating means for said control circuit producing a pair of consecutive pulses of opposite polarities in said terminal phase for effecting said return sweep and arresting said light-deflecting means in said initial position, respectively; and
   synchronizing means controlled by said feed means for triggering said signal-generating means and matching said forward sweep to the advance of said strip, said synchronizing means including guide means for leading part of said strip along an arc of a circle and claw means mounted for oscillation about the center of said circle along said arc, said claw means being provided with biasing means urging same into engagement with a perforation of said strip aligned therewith and being operatively coupled with said light-deflecting means for matching the pivotal motion of the latte to the advance of said strip during said forward sweep.

5. An apparatus as defined in claim 4 wherein said optical means includes objective means positioned substantially midway between said transfer point and said light-deflecting means for making the swing range of said light-deflecting means substantially equal to the travel of a perforation along said arc during said forward sweep.

* * * * *